United States Patent [19]

Dyott et al.

[11] Patent Number: 5,739,944
[45] Date of Patent: Apr. 14, 1998

[54] SUPPORT SYSTEM FOR RESONATING ELEMENT OF PHASE MODULATOR

[75] Inventors: Richard B. Dyott, Oak Lawn; Steven R. Emge, Mokena, both of Ill.

[73] Assignee: KVH Industries, Inc., Middletown, R.I.

[21] Appl. No.: 738,724

[22] Filed: Oct. 28, 1996

[51] Int. Cl.⁶ .................. G02F 1/11; G01B 11/02
[52] U.S. Cl. .................. 359/287; 385/1; 356/350
[58] Field of Search .................. 359/285, 287; 385/1, 3; 356/350

[56] References Cited

U.S. PATENT DOCUMENTS

| | | | |
|---|---|---|---|
| 4,786,173 | 11/1988 | Fournier et al. | 356/350 |
| 4,789,241 | 12/1988 | Michal et al. | 356/350 |
| 5,289,258 | 2/1994 | Szafraniec et al. | 356/350 |
| 5,357,339 | 10/1994 | Teraoka et al. | 356/350 |

*Primary Examiner*—Mark Hellner
*Attorney, Agent, or Firm*—Foley, Hoag & Eliot LLP

[57] ABSTRACT

A phase modulator is provided with supports attached to the resonating element. The supports have a length which is an odd number of quarter wavelengths of a longitudinal acoustic wave excited in the supports by the resonating element. As such, a longitudinal acoustic wave excited at the resonating element end of the support travels along the support, is reflected at the other end of the support, and returns in opposite phase to that of the excited wave, thereby causing a null in longitudinal amplitude of the wave and reducing the damping of the resonating element.

14 Claims, 3 Drawing Sheets

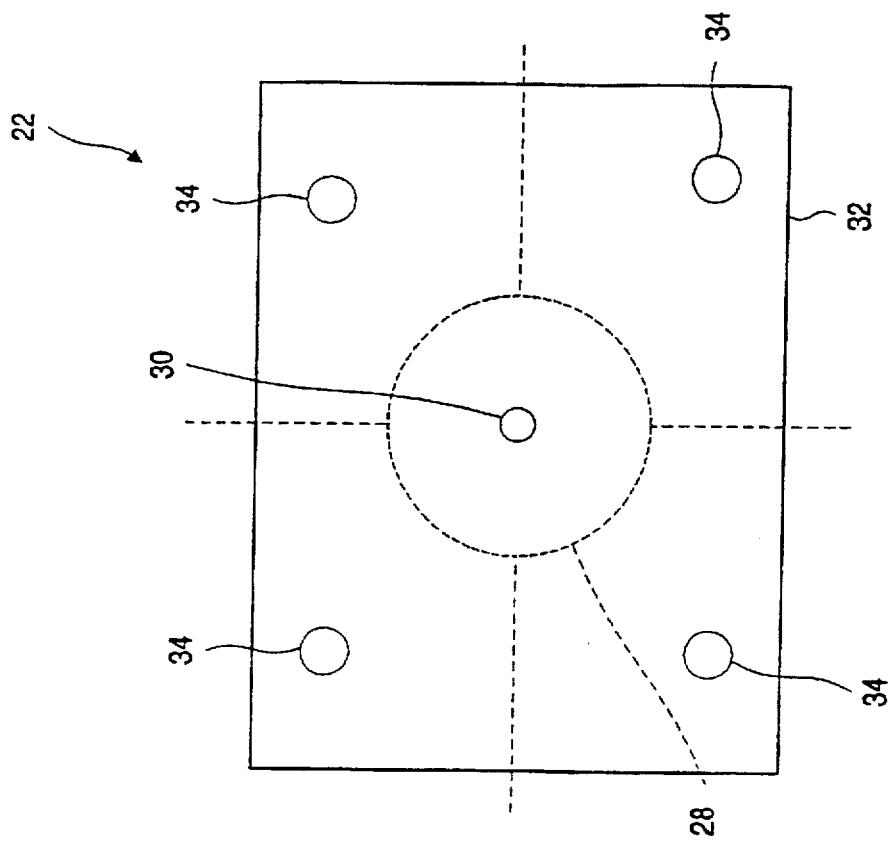
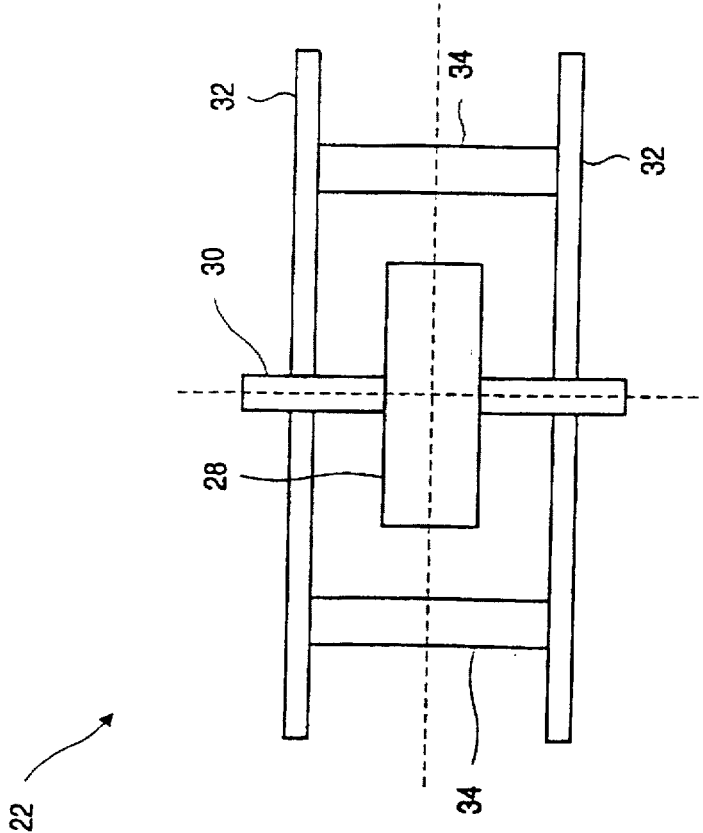
FIG. 2b
FIG. 2a

SUPPORT SYSTEM FOR RESONATING ELEMENT OF PHASE MODULATOR

FIELD OF THE INVENTION

The present invention generally involves phase modulators used in optical fiber transmission, and in particular involve the support systems for the resonating elements of the phase modulators.

BACKGROUND OF THE INVENTION

In a typical fiber optic gyro, light from a laser or some other suitable light source is divided into two separate beams by means of some form of a beam splitter and then coupled into the two ends of a multiturn coil of optical fiber, typically of the single-mode type. Light emerging from the two fiber ends is combined by the beam splitter and detected by a photodetector.

Rotation sensing is typically accomplished by detection of a rotationally induced phase shift, commonly referred to as the "Sagnac Phase Shift", between the light beams propagating in opposite directions around the closed loop formed by the coil of optical fiber. The detected signal corresponding to the phase difference between the opposing beams is typically subjected to some form of phase modulation and the photodetector converts the modulation to an electric signal which is indicative of the degree of rotation of the fiber coil. Referring now to FIG. 1, there is shown a block diagram illustrating a conventional optical fiber gyro system operating in an open-loop mode. The gyro system 10 includes an optical source 12 which is preferably a diode laser oscillating predominantly in a single transverse mode and having a broad and Gaussian-shaped optical spectrum so that back-scatter noise and Kerr effect problems are reduced. A light beam from the optical source 12 is directed to a optical directional coupler 14 which functions as a beam splitter.

A portion of the light beam entering the directional coupler 14 is transmitted through a polarizer 16 before being directed into a second optical directional coupler 18. The direction coupler 18 functions as a beam splitter to realize two separate light beams, one of which is directed into one end of a multiturn fiber coil 20. The other light beam from the directional coupler 18 is directed through a phase modulator 22 into the other end of the fiber coil 20. Light emerging from the two fiber ends is combined by the directional coupler 18 and detected by an optical photodetector 24.

The light beams directed into the two ends of the fiber coil 20 constitute counter-propagating beams which have identical path lengths in the absence of coil rotation. When the fiber coil 20 undergoes rotation about its axis of symmetry, the relative path lengths of the two light beams also change correspondingly. For instance, if the coil rotates in a clockwise direction, the path length of the clockwise beam is increased while the path length of the counterclockwise beam decreases. As a result, any rotation of the optical fiber coil causes the two counter-propagating beams to undergo a non-reciprocal phase shift. This phenomenon is known as the Sagnac effect and the non-reciprocal phase shift due to rotation is termed as the Sagnac phase shift which, if measured accurately, provides a true indication of the degree of rotation experienced by the fiber coil.

The phase modulator 22 in the gyro system of FIG. 1 performs this function by creating the desired amount of phase difference modulation so that the amplitude of the optical power, which varies at the frequency of phase modulation $f_m$, is made proportional to small rotation rates. Since the phase modulator 22 is positioned at one end of the fiber coil 20, the two counter-propagating light beams both receive the same phase modulation but at different times, thereby realizing a non-reciprocal phase difference modulation between the interfering beams.

The phase modulator 22 is typically of the mechanical modulation type wherein a short section of optical fiber is wrapped over a piezoelectric (PZT) disc. When a time-varying electric field is applied to the PZT disc, mechanical stress is induced therein and varies the radius of the disc. As a result, the diameter of the fiber around the PZT disc is also varied correspondingly. Hence, the fiber diameter and refractive indices and, therefore, the phase of the wave being guided through the polarizer, are modulated in proportion to the applied signal.

Ideally, the resonating disc should be supported in such a way as to allow free vibration in the radial direction with a minimum amount of damping.

SUMMARY OF THE INVENTION

To accomplish this and other objects of the present invention, a support system for the resonating element of a phase modulator is provided with supports attached to the resonating element. The supports have a length which is an odd number of quarter wavelengths of a longitudinal acoustic wave excited in the supports by the resonating element. As such, a longitudinal acoustic wave excited at the resonating element end of the support travels along the support, is reflected at the other end of the support, and returns in opposite phase to that of the excited wave, causing a null in longitudinal amplitude of the wave at the point of support of the resonating elements thereby reducing the damping of the resonating element.

BRIEF DESCRIPTION OF THE DRAWINGS

Other aspects and advantages of the present invention may become apparent upon reading the following detailed description and upon reference to the drawings in which:

FIG. 2a shows a side view of a phase modulator which can incorporate principles of the present invention, and FIG. 2b shows a top view of the phase modulator of FIG. 2a; FIG. 3b shows a side view of the piezoelectric disc and stubs of FIG. 3a.

Figure 1:
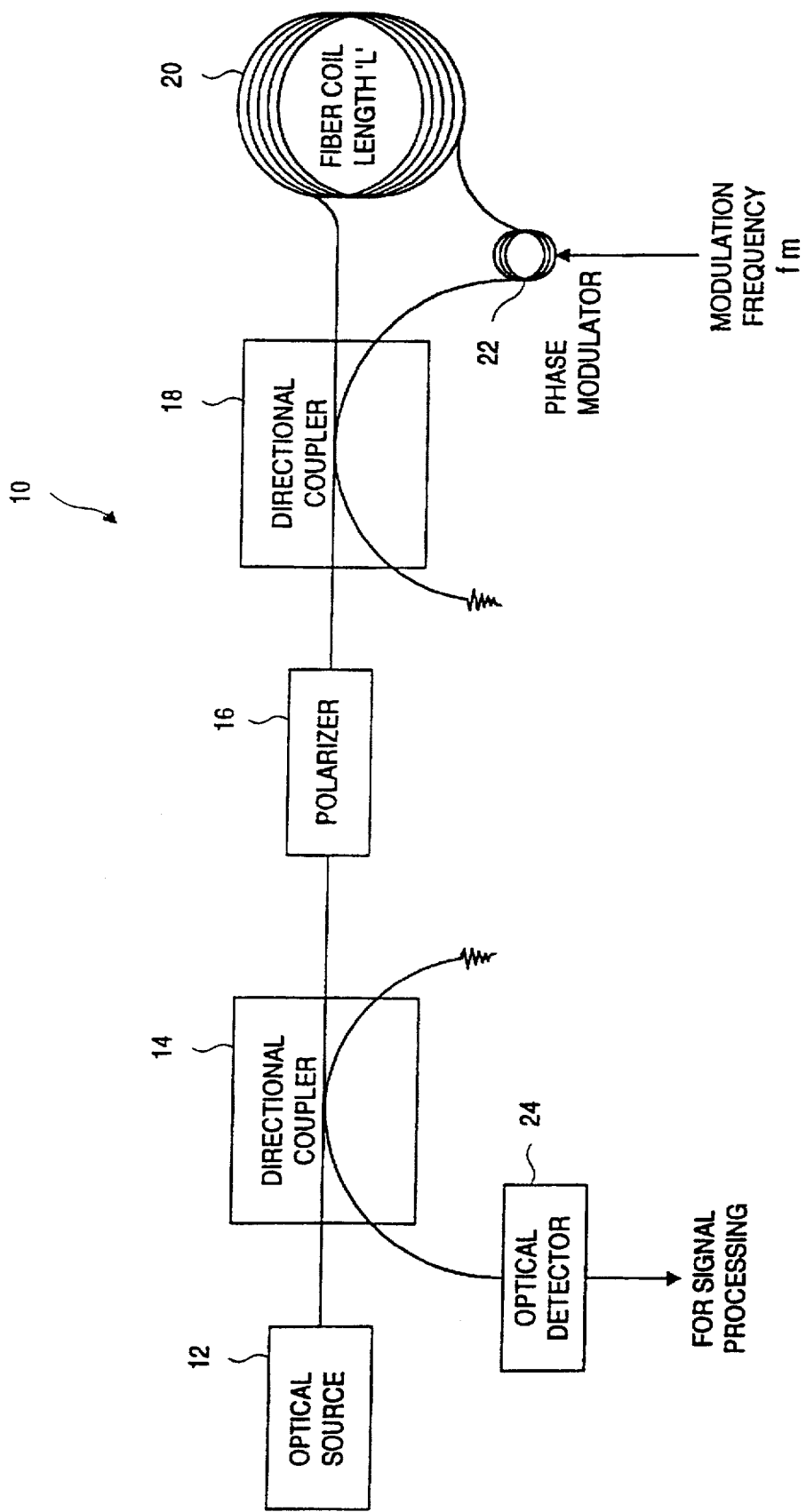
FIG. 1 shows an open loop optical fiber gyro using a phase modulator which can take advantage of the principles of the present invention.

While the invention is susceptible to various modifications and alternative forms, specifics thereof have been shown by way of example in the drawings and will be described in detail. It should be understood, however, that the intention is not to limit the invention to the particular embodiment described. On the contrary, the intention is to cover all modifications, equivalents, and alternatives falling within the spirit and scope of the invention as defined by the appended claims.

DETAILED DESCRIPTION OF THE PREFERRED EMBODIMENT

An illustrative embodiment of the improved support system for a phase modulator according to the principles of the present invention is explained and described below as it might be implemented. FIGS. 2a and 2b show side and top views of a phase modulator 22 which can take advantage of the principles of the present invention. The phase modulator 22 for an open-loop fiber gyro 10 (FIG. 1) comprises a disc resonator 28 made of piezo-electric material, around which is wrapped several turns of the fiber 20 (FIG. 1) comprising the Sagnac interferometer. The disc 28 is supported axially by top and bottom stubs 30. The driving voltage is applied via the electrical connection of the stubs 30 to the center of the disc 28. The metal stubs 30 are attached to top and bottom plates 32, and pillars 36 are attached between the top and bottom plates 32 for support.

Figure 3A:
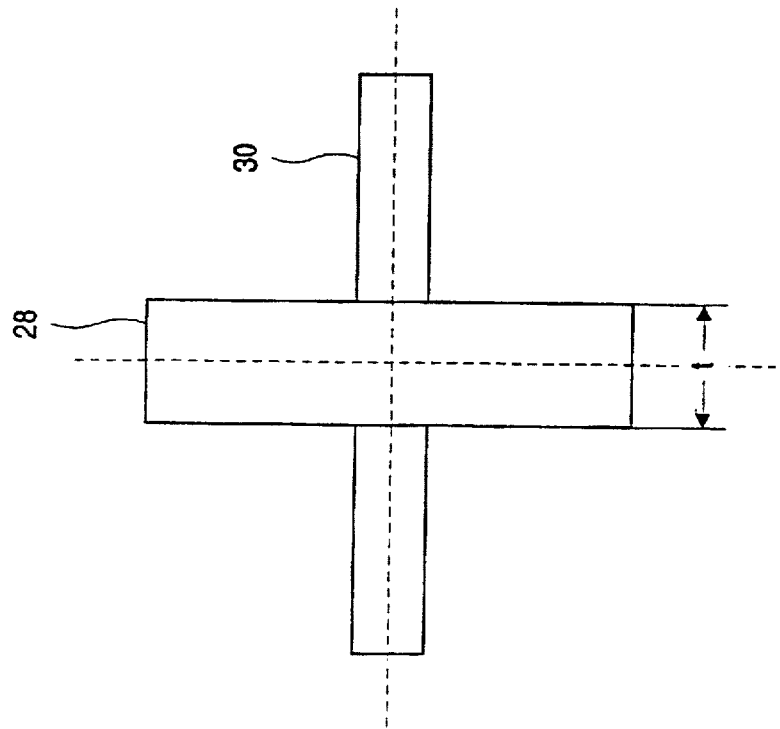
FIG. 3a shows a top view of a piezoelectric disc and stubs which can incorporate the principles of the present invention.
Figure 3A:
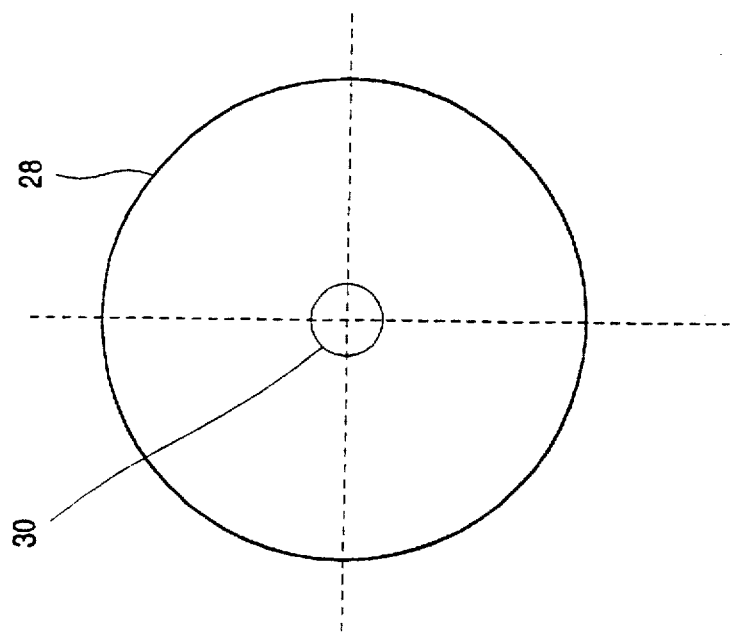

When a time-varying electric field is applied to the PZT disc 28, the resonant disc 28 vibrates in the radial mode producing a change in the transmission characteristics of the fiber 20, leading to a phase shift between the two counter-propagating optical paths. FIGS. 3a and 3b show top and side views of the piezoelectric disc 28 with supports 30 contacting the disc 28. When the drive voltage is applied to the PZT disc 28, a pressure wave propagates radially from the center of the disc 28 to the rim where it is reflected back to the center in the same phase as the outgoing wave. An axial wave, which is coupled to the radial wave, propagates axially from the center of the disc 28 to the side of the disc 28 and along the stubs 30 where it is reflected at the end of the stub 30 back to the center in the same phase as the outgoing wave. Because the radial and axial waves are coupled, any damping of the axial wave results in damping of the radial wave.

To reduce the damping of the disc resonance caused by the damping of the axial wave, the stubs 30 should be of a length that a longitudinal acoustic wave excited at the disc end of the stub 30 travels along the stub 30 is reflected at the free end, and returns in opposite phase to that of the excited wave, thereby causing a null in longitudinal amplitude of the wave at the point of support of the disc. As such, the stub 30 should have a length which is an odd number of quarter wavelengths of the longitudinal acoustic wave. Thus, to minimize damping of the axial wave, the stub 30 is made one quarter of a wavelength long In this particular embodiment, the supports 30 are brass stubs. The velocity of sound in a thin brass rod is given as 3480 m/sec by the CRC Handbook (p. E47). If the length of the stub 30 is about 6.35 mm producing a first resonance in the axial mode at $\lambda_m/2=6.35^{-3}$m, $\lambda_m=1.27^{-2}$m, with a frequency $f_1=3480/1.27^{-2}=274.015\times10^3$ Hz. Thus, at the present disc resonant frequency of about 135 kHz, the stub 30 is almost exactly one quarter of a wavelength long, making it an ideal support for the disc 28. Because there is no axial movement at the end of the stub 30, the stub support 30 is isolated from the disc resonance, and therefore the damping of the disc resonance is reduced. The stub resonance at the second harmonic, however, will amplify any second harmonic frequency generated by the PZT oscillator that drives the disc 28, causing problems with gyro offset, but a solution to this problem is to reduce the radial to axial coupling in the disc by reducing the thickness of the disc 28.

The quarter wavelengths of stubs made from various materials are tabulated below.

| Material | Length of stub in mm. |
| --- | --- |
| Brass (70% copper, 30% zinc) | 6.35 |
| Mild Steel | 9.62 |
| Stainless Steel: 347 | 9.26 |
| Aluminum (rolled) | 9.26 |
| Duralumin: 178 | 9.54 |

The principles of the present invention, which have been disclosed by way of the above examples and discussion, can be implemented using other structures, configurations and implementations. Those skilled in the art will readily recognize that these and various other modifications and changes may be made to the present invention without strictly following the exemplary application illustrated and described herein and without departing from the true spirit and scope of the present invention.

What is claimed is:

1. A support system for use in a phase modulator comprising:

a resonating element; and supports contacting the resonating element, said supports have a length which is an odd number of quarter wavelengths of a longitudinal acoustic wave excited in the supports by the resonating element.

2. The support system of claim 1 wherein said resonating element is a piezoelectric disc.

3. The support system of claim 1 wherein said supports are top and bottom stubs contacting the top and bottom respectively of said resonating element.

4. The support system of claim 1 wherein said supports apply a driving voltage to said resonating element.

5. The support system of claim 1 wherein a portion of an optical fiber from a gyroscope is wrapped around said resonating element.

6. The support system of claim 3 further includes top and bottom plates attached to said top and bottom stubs respectively.

7. The support system of claim 6 further includes pillars attached between said top and bottom plates.

8. A support system for use in a phase modulator comprising:

a resonating disc which vibrates in a radial direction;

top and bottom axial stubs contacting the top and bottom respectively of said resonating disc for axially supporting the resonating disc, each stub having a length of an odd number of quarter wavelengths of a longitudinal acoustic wave excited in said top and bottom stubs by the resonating disc.

9. The support system of claim 8 wherein said resonating disc is a piezoelectric disc.

10. The support system of claim 8 wherein said stubs apply a driving voltage to said resonating disc.

11. The support system of claim 8 wherein a portion of an optical fiber from a gyroscope is wrapped around said resonating disc.

12. The support system of claim 8 further includes top and bottom plates attached to said top and bottom stubs respectively.

13. The support system of claim 12 further includes pillars attached between said top and bottom plates.

14. A phase modulator for a gyroscope which includes a coil of optical fiber, said phase modulator comprising:

a piezoelectric disc wrapped in a portion of said optical fiber, said disc vibrates in a radial direction when a driving voltage is applied to said disc;

top and bottom axial stubs contacting the top and bottom respectively of said disc for axially supporting said disc and for providing the driving voltage to said disc, each stub having a length of an odd number of quarter wavelengths of a longitudinal acoustic wave excited in said top and bottom stubs by the disc;

top and bottom plates attached to said top and bottom stubs respectively; and support pillars attached between said top and bottom plates.

* * * * *